Dec. 26, 1939.  G. W. WHITEHURST  2,185,108
OUTLET CONTROL VALVE
Original Filed Sept. 13, 1937
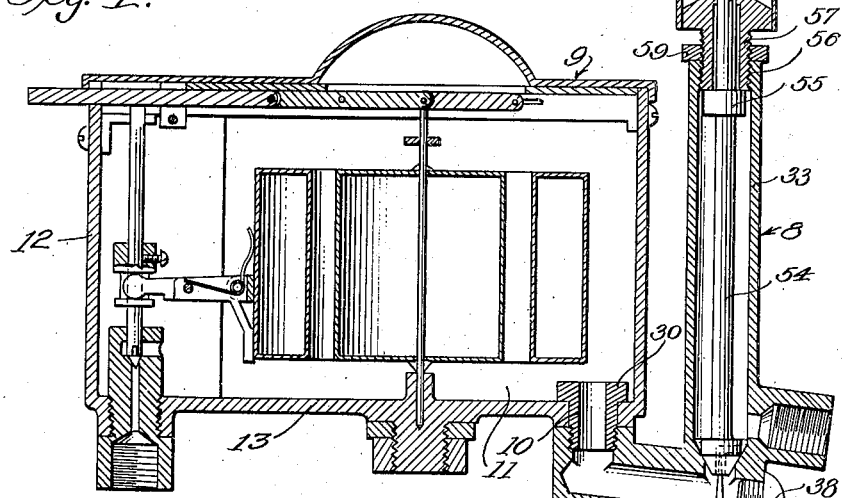
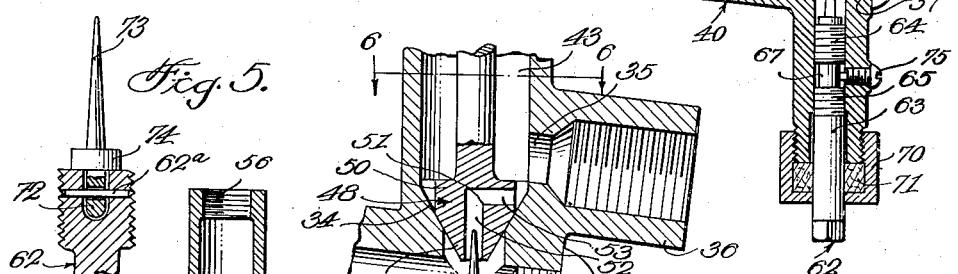
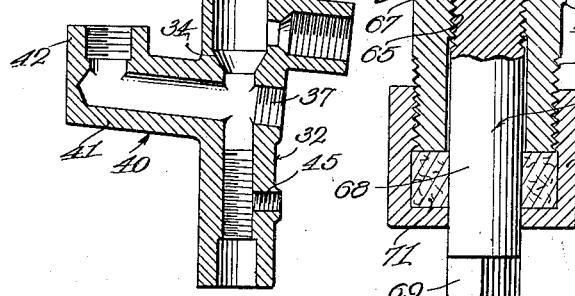
Inventor
George W. Whitehurst
By Kimmel & Crowell
Attorneys.

Patented Dec. 26, 1939

2,185,108

UNITED STATES PATENT OFFICE 2,185,108

OUTLET CONTROL VALVE

George W. Whitehurst, Portsmouth, Va.

Original application September 13, 1937, Serial No. 163,710. Divided and this application May 24, 1938, Serial No. 209,814

3 Claims. (Cl. 277—57)

This invention relates to a controllable oil outlet structure for use in connection with the supplying of oil to oil burners and is a division of my co-pending application filed September 13, 1937, Serial Number 163,710.

The invention has for its object to provide, in a manner as hereinafter set forth, a structure of the class referred to including a controllable valvular element for the oil supplied for high fires and an adjustable valvular element coacting with the said other element for controlling the oil supplied for low fires to a minimum.

A further object of the invention is to provide, in a manner as hereinafter set forth, an outlet valve for oil supplied for high fires formed with a port for the passage of the oil supplied for low fires, and an adjustable regulating element of valvular form coacting with said port for regulating the amount of the oil supplied for low fires.

A further object of the invention is to provide, in a manner as hereinafter set forth, a structure of the type referred to, including a supply or outlet valve having large capacity for oil delivery for high fires.

A further object of the invention is to provide, in a manner as hereinafter set forth, a structure of the type referred to including a liftable high fire controlling valve, a lower fire controlling valve and means for scavenging or flushing out the accumulations of small particles that may collect around the low fire controlling valve, each time the high fire controlling valve is lifted from its seat.

A further object of the invention is to provide, in a manner as hereinafter set forth, a structure of the type referred to having the high and low fire valves with their coacting ports and passages so arranged in a related manner and below the oil level so that all air may escape due to the greater bouyancy caused by greater depth, and after all air is out these ports and passages remain filled with oil even though the oil supply in float chamber and burner has been exhausted.

A further object of the invention is to provide, in a manner as hereinafter set forth, a structure of the type referred to including a controllable supply or outlet valve having large capacity for oil delivery for high fires and formed with means for small oil delivery for low fires, and with said structure including adjustable means associated with said valve for regulating delivery for small fires to an extent whereby delivery for low fires, if desired may be at the rate of a few drops per minute.

A further object of the invention is to provide, in a manner as hereinafter set forth, a structure of the type referred to including means for controlling oil feed for high fires and means coacting with and engaging in the said other means for controlling oil feed for low fires.

Further objects of the invention are to provide, in a manner as hereinafter set forth, a structure for the purpose referred to which is simple in its construction and arrangement, strong, durable, compact, thoroughly efficient in its use, expeditiously installed with respect to an oil supply, readily assembled, and comparatively inexpensive to manufacture.

To the above ends essentially and to others which may hereinafter appear, the invention consists of the novel construction, combination and arrangement of parts as will be more specifically described and illustrated in the accompanying drawing wherein is shown an embodiment of the invention, but it is to be understood that changes, variations and modifications may be resorted to which fall within the scope of the invention as claimed.

In the drawing:

Figure 1 is a vertical sectional view illustrating, by way of example, the controllable oil outlet structure, in accordance with this invention installed with respect to a safety control and oil levelling valve structure of the form set forth in my co-pending application aforesaid, Figure 2 is a fragmentary view in vertical section and upon an enlarged scale of the controllable oil outlet structure in accordance with this invention, Figure 3 is a section on line 3—3, Figure 2, Figure 4 is a vertical sectional view of the housing forming an element of the controllable oil outlet structure, Figure 5 is a detail in section and side elevation showing the adjustable regulating element, and Figure 6 is a section on line 6—6, Figure 2.

With reference to Figure 1 of the drawing the controllable oil outlet structure is generally indicated at 8 and which is coupled to and permanently opens into a source of oil. The said source, by way of example, is shown as a safety control and oil levelling structure 9 disclosed by my co-pending application aforesaid. As the structure 9 forms no part of this invention, nor is it claimed, it is thought not necessary to specifically describe it other than to refer to the outlet 10 for the oil reservoir 11. The latter is provided by the housing 12. The outlet 10 is in the bottom 13 of housing 12. It is to be understood that the structure 8 is for communication with other sources of oil other than that as shown.

The structure 8 includes a tubular housing 32 which is coupled to the bottom 13 of housing 12. The housing 32 consists of an upstanding tubular part 33 provided between its transverse median and its lower end with an internal beveled valve seat 34 and above and in proximity to seat 34 with an outlet opening 35 and a laterally disposed downwardly inclined tubular conducting off branch 36 permanently communicating at its inner end with the opening 35. The branch 36 is internally threaded for connecting thereto an oil delivery line, not shown for supplying the burner not shown. Below the valve seat 34, the part 33 is formed with an inclined threaded opening 37 closed by a cap screw 38. The part 33 in alignment with the opening 37 and below valve seat 34 is provided with an opening 39 disposed at the same inclination as opening 37. Integral with the part 33 and extending in an opposite direction with respect to that of the branch 36 is a laterally disposed tubular angle-shaped feed branch 40, having a leg 41 disposed at an inclination with respect to the horizontal and a vertically disposed leg 42 at the outer end of leg 41. The leg 42 at its inner end merges into the part 33. The leg 41 is internally threaded and engaging therewith is a tubular nipple 30, which not only connects housing 32 to housing 12, but also establishes communication between the reservoir 11 and the outlet valve chamber 43 formed by that portion of part 33 above valve seat 34. The part 33 below the openings 37, 39 is formed with a group of threads 44 on its inner face and with an opening 45 intermediate the ends of the group 44. The outer periphery of the part 33 below the opening 45 is formed with screw threads 46. The outer face of part 33 is formed with an annular boss 47 which surrounds the outer end of opening 45. The part 33 is open at its upper and lower ends.

Arranged within the chamber 43 and coacting with the seat 34 is a vertically disposed outlet valve head 48 formed of a lower beveled part 49 and a peripherally fluted upper part 50 of uniform diameter and of less length than the part 49. The head 48 is provided with an angle-shaped port 51 formed of a vertical branch 52 and a horizontal branch 53. The branch 52 is disposed axially of and opens at the lower end of head 48. The branch 52 extends to the part 50 of head 48 and opens at its upper end into the inner end of branch 53. The latter is formed in and opens at its outer end at the side of part 49. The part 50 of head 48 is of less diameter than that of chamber 43 above the valve seat 34. Integral with and axially of the top of head 48 is a stem 54, of a length to project above the upper end of part 33 and formed with a stop collar 55. Extending into the top and threadedly engaging with the threads 56 on the inner face of part 33 is a flanged tubular high fire adjusting screw cap 57 formed at its top with an opening 58 for the passage of stem 54. The cap 57 is to seat against the collar 55 when adjusting stem 54. A lock nut 59 for the screw 57 is mounted on the top of part 33. The stem 54 above cap 57 carries a dust collar 59a and has its upper end bifurcated, as at 60 for attachment thereto by a connection 61, a heavy fire control not shown, operated from a thermostat.

The inner diameter of that portion of the part 33 which depends from the valve seat 34 is less than that of the valve chamber 43 and adjustably mounted in such portion is an oil feed regulating element 62 which associates with the valve head 48 and includes a vertically adjustable carrier 63 of rod-like form formed with an upper portion 64 provided with a pair of spaced groups of peripheral threads 65, 66 and an annular peripheral groove 67 separating the groups of threads. The carrier 63 includes a plain lower portion 68 having a polygonal shaped outer end 69. The carrier 63 is of circular cross section and its groups of threads adjustably engage with the threads 44 of part 33. The element 62 depends from the lower end of part 33 through a packing gland or cup 70 and the packing means 71 in the latter. The gland is internally threaded and engages with the threads 46 on part 33. The portion 64 of carrier 63 is formed with an axial socket 72 opening at its upper end. Extended into the socket 72 is the lower portion of an upstanding feed regulating member in the form of a tapered needle valve 73 provided with a flange 74 which seats on the top of portion 64. The valve 73 is of a length to extend into the leg 52 of the port 51 in head 48. The needle valve 73 is slightly loosely fitted in socket 72 for alignment with branch 52 of port 51 and is secured to element 62 by a pin 62a. The diameter of the upper portion of valve 73 is materially less than that of branch 52 of port 51. The upward and downward movement of element 62 is limited by a stop member in the form of a cap screw 75 having a reduced inner end 76 arranged in the groove 67. The screw 75 extends through and threadedly engages with the wall of the opening 45. The head of screw 75 abuts the boss 47. The reduced end 76 of screw 75 is of a width and breadth less than that of the width of groove 67.

The valve 48 is fluted to permit air to escape. The upward movement of the valve 48 is arrested by collar 55 abutting screw 57. The port 51 in valve 48 is for regulating the amount of oil for low fire and such port is controlled by the element 62, that is to say, the valve 73 of element 62. The valve 73 will be free from the valve 48 about .005 of an inch to insure positive seating of valve 48 even though slightly out of alignment. This arrangement permits a close setting of oil for low fire in an easy manner, and a flushing out of the minute particles that accumulate at the small settings. Every time the valve 48 is raised oil passes out through outlet 36 to burner, or when valve 48 is sealed oil passes to the burner through the port 51 when the latter is not closed by the regulating element. On high fire oil is supplied through port 51 and under valve head 48 simultaneously.

The upper end of valve 54 and inner wall of adjusting screw 57 can be threaded for manually operating valve head 48 to and from its seat 34.

The valve head 48, needle valve 73 and outlet port 35 are located substantially below bottom 13 of the housing so that coupling 30, branch 40, port 51 and pipe connecting 36 to burner, not shown, will always be full of oil, when once free of air, even when oil is shut off and burner has consumed all the oil that will enter burner. This important oil conducting course is completely filled with oil.

What I claim is:

1. In a controllable liquid fuel outlet structure for use in connection with liquid fuel burners, an upstanding tubular housing provided on its inner face intermediate its ends with a tapered valve seat, said housing being formed with a fuel intake in proximity to the bottom of said seat, a fuel outlet in proximity to the top of said seat and internal threads below said seat, a peripherally fluted tapered controllable liquid fuel outlet controlling valve for high fires within the housing above and for correlation with said seat, said valve being formed with a port having a vertical and a horizontal leg for the passage of fuel for low fires when the valve is seated, a vertically adjustable, upstanding, revoluble regulating means within and threadedly engaging directly with the housing and positioned below said seat for correlation with the valve port to control the supply of fuel for low fires when the valve is seated, said means being formed at its upper portion with a pair of spaced peripheral groups of threads separated by an endless groove, said means including a loosely mounted needle valve at its upper end for correlation with the vertical leg of said port, and a stop carried by the housing and engaging in and coacting with the walls of said groove for limiting the extent of movement of the said means in opposite directions lengthwise of said housing.

2. A controllable liquid fuel outlet structure for use in connection with liquid fuel burners, said structure comprising an upstanding tubular housing provided on its inner face intermediate its ends with a tapered valve seat, said housing being formed with a fuel intake below and in proximity to the bottom of said seat, a fuel outlet above and in proximity to the top of said seat and internal threads on its inner face below said intake, a peripherally vertically fluted tapered controllable liquid outlet controlling valve for high fires within the housing above and for correlation with said seat, said valve being formed with a port having a vertical and a horizontal leg for the passage of fuel for low fires when the valve is seated, said vertical leg opening at its lower end at the bottom of the valve, said horizontal leg opening at the side of the valve, a revoluble vertically adjustable carrier of rod-like form mounted in the lower portion of and extending from the lower end of the housing, such carrier being formed with peripheral threads for engagement with the threads of the housing, said carrier provided at its upper end with a socket, a needle valve seated intermediate its ends on the top edge of the carrier for correlation with said vertical leg and extending into said socket and loosely connected to the carrier, and said carrier and housing having coacting means for limiting the extent of the movement of the carrier in opposite directions.

3. A controllable liquid fuel outlet structure for use in connection with liquid fuel burners, said structure comprising an upstanding tubular housing provided on its inner face intermediate its ends with a tapered valve seat, said housing being formed with a fuel intake below and in proximity to the bottom of said seat, a fuel outlet above and in proximity to the top of said seat and internal threads on its inner face below said intake, a peripherally vertically fluted tapered controllable liquid outlet controlling valve for high fires within the housing above and for correlation with said seat, said valve being formed with a port having a vertical and a horizontal leg for the passage of fuel for low fires when the valve is seated, said vertical leg opening at its lower end at the bottom of the valve, said horizontal leg opening at the side of the valve, a revoluble vertically adjustable carrier of rod-like form mounted in the lower portion of and extended from the lower end of the housing, such carrier being formed with peripheral threads for engagement with the threads of the housing, said carrier provided at its upper end with a socket, a needle valve seated intermediate its ends on the top edge of the carrier for correlation with said vertical leg and extending into said socket and loosely connected to the carrier, said carrier and housing having coacting means for limiting the extent of the movement of the carrier in opposite directions, and a packing means secured against the lower end of the housing and encompassing carrier.

GEORGE W. WHITEHURST.